United States Patent [19]

Dugas

[11] 4,275,765
[45] Jun. 30, 1981

[54] DIRECTION CONTROL FLUSH VALVE

[75] Inventor: Roger A. Dugas, Chester, N.H.

[73] Assignee: Hewlett-Packard Company, Palo Alto, Calif.

[21] Appl. No.: 108,629

[22] Filed: Dec. 31, 1979

[51] Int. Cl.³ .............................................. F16K 7/02
[52] U.S. Cl. .............................. 137/625.48; 251/331; 137/DIG. 4
[58] Field of Search .................... 137/625.48, DIG. 4; 251/331, 61.1

[56] References Cited

U.S. PATENT DOCUMENTS 3,548,878  12/1970  Brigandi ........................... 251/331 X

FOREIGN PATENT DOCUMENTS 959817  12/1974  Canada ................................. 137/625.48

Primary Examiner—Arnold Rosenthal
Attorney, Agent, or Firm—Donald N. Timbie

[57] ABSTRACT

A direction control flush valve is described in which a hollow cylindrical valve stem that is mounted for rotation within a cylindrical cavity in a valve body is provided with a pair of openings through the wall that subtend a given angle between them and a circumferential groove in a surface of the stem between the openings, there being passageways entering said cavity that are separated by the given angle, whereby rotation of the stem connects adjacent passageways via the circumferential groove. An elastomeric projection is mounted within the hollow stem so as to normally block said openings and thereby prevent flush fluid introduced into the confined space between the inner wall of the stem and the outer wall of the projection from reaching the openings and hence the passageways, but permitting the fluid to reach the openings and passageways when the cross-section of the elastomeric member is reduced by elongation.

10 Claims, 9 Drawing Figures

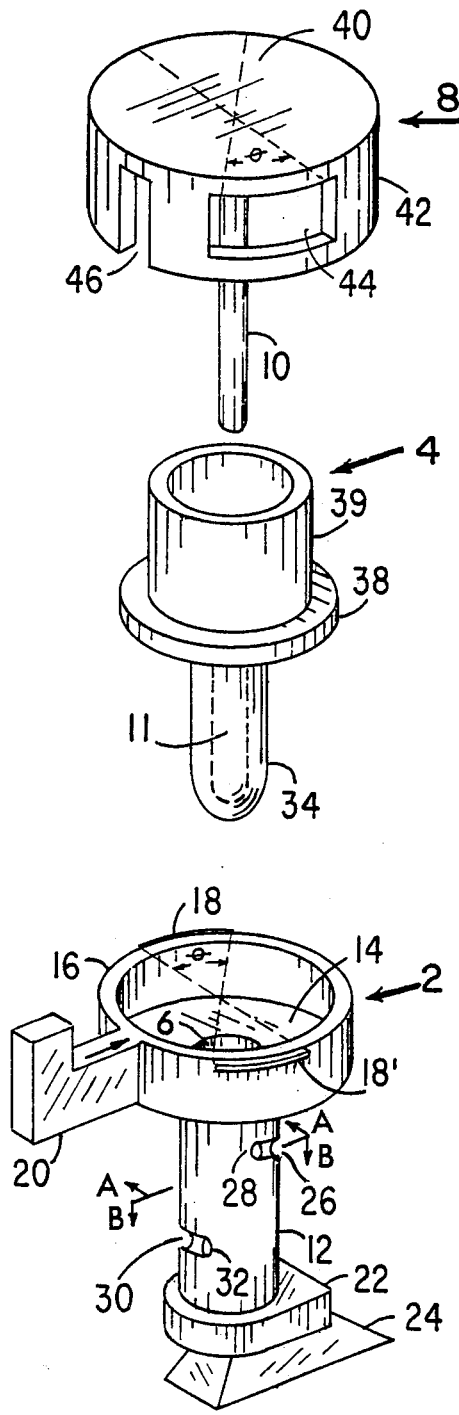
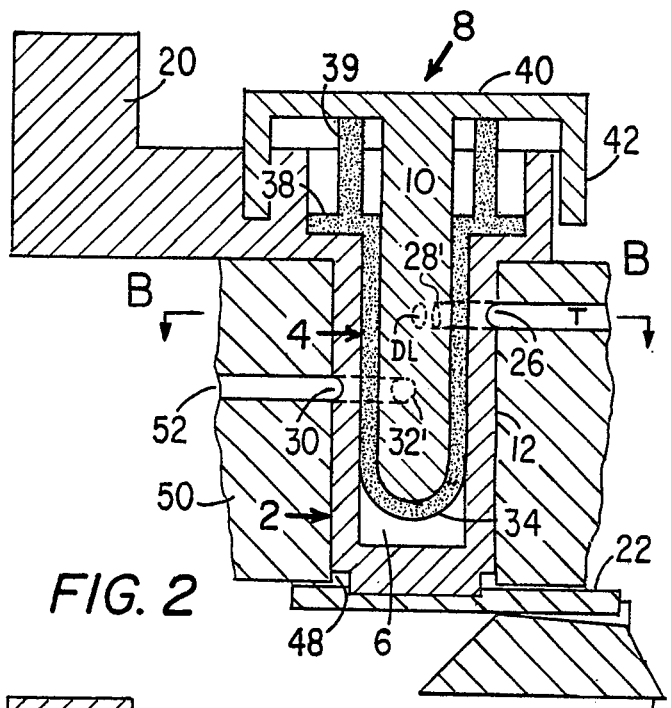
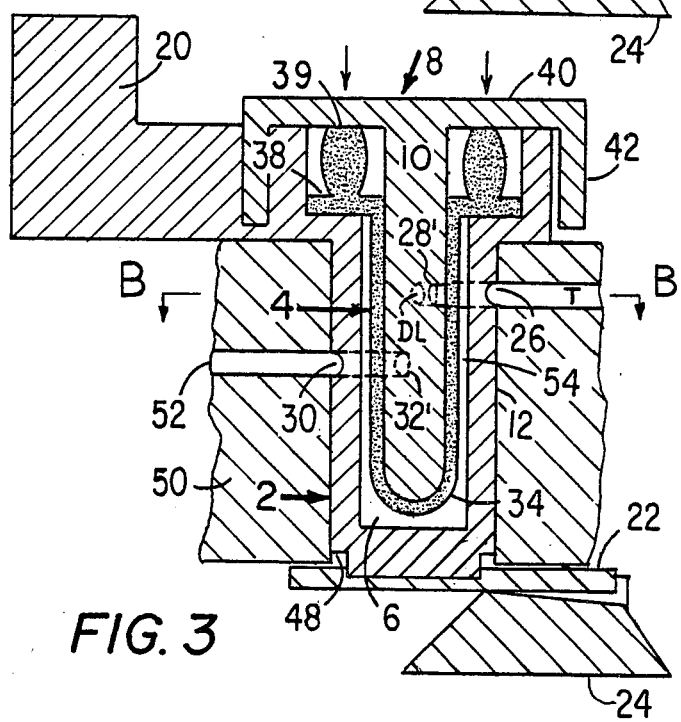

DIRECTION CONTROL FLUSH VALVE

BACKGROUND OF THE INVENTION

In certain types of hemodynamic systems, a pressure transducer is attached to a pressure dome that is selectively connected by valve means to either of two catheters inserted into the patient's body. In order to reduce the chances of blood particles clogging the catheters, the blood pressure is translated to the transducer by a fluid, usually a saline solution, that fills the pressure dome and the catheters. Further reduction in clogging has been achieved by introducing a slow steady flow of the fluid into the patient's body via the catheters. Even so, it has been found necessary to cause a fast flow or flush of fluid through the catheters from time to time. The means used to introduce the fast flush should be failsafe, i.e., it should permit a fast flush to occur only when it is activated by an operator. Otherwise, enough fluid might flow into the patient to cause injury or into the pressure dome to cause a false alarm of high blood pressure. Heretofore, this function has been performed by an expensive combination of a number of separate valves that can be improperly set so as to connect both catheters to the pressure dome.

BRIEF DISCUSSION OF THE INVENTION

In accordance with the invention, a single valve mechanism is provided for making the desired connections between a transducer and either of the two catheters and for providing the fast flush of fluid through the connections selected. In a preferred embodiment, a cylindrical cavity is formed in a valve body and passageways within the body enter the cavity at different points within a radial plane, the arc between one point and the points on either side subtending a given angle. The outer ends of two passageways can be respectively connected to different catheters and the outer end of the third passageway can be connected to a transducer. A hollow valve stem that is closed at one end and open at the other is mounted in the cavity. Its outer surface is cylindrical and has such diameter as to provide a fluid seal against the inner wall of the cavity. A pair of openings communicate between the space inside the hollow stem and points on the cylindrical surface thereof that are in the radial plane in which the passageways enter the cavity. Communication between the openings is provided by a groove in a surface of the hollow stem, preferably in the outer cylindrical surface thereof.

An elastomeric projection is inserted into the hollow valve stem so as to block its open end and thereby provide a confined space between it and the inner walls and closed end of the hollow stem. The exterior of the projection is so shaped and has such cross-section when in a normal condition of axial stress as to block the inner ends of the openings in the wall of the hollow stem.

A channel through which flush fluid may be passed is defined in the valve body and enters the cavity in the valve body at a different point than the points of entry of the aforesaid passageways. A port is defined through the wall of the hollow stem, and means are provided for permitting communication between the port in the stem and the channel in the valve body for any desired rotational position of the stem. The elastomeric projection may or may not block the inner end of the port in the stem when in its normal condition of axial stress.

When, as has been mentioned, the projection is in its normal state of axial stress, it blocks the inner ends of the openings in the wall of the valve stem so that flush fluid entering the confined space between the outside of the projection and the inside of the hollow stem via the channel and port cannot reach the passageways. When, however, the elastomeric projection is elongated along the axis of the stem, its cross-sectional area is reduced so as to permit the flush fluid to reach the passageways. Any means can be provided for elongating the elastomeric projection in this manner but preferably it is accomplished by making the projection in the form of a hollow bladder of elastomeric material and mounting a plunger within the bladder that can be pressed so as to elongate the bladder. The plunger may extend from a cap and resilient means may be placed between the cap and the stem so as to return the plunger to its initial position when pressure is removed from the cap.

BRIEF DESCRIPTION OF THE DRAWINGS

FIG. 1 is an exploded projection view of the parts of a valve incorporating the invention;

FIG. 2 is a vertical cross-section AA of an assembled valve of FIG. 1 illustrating the relationship between parts when fast flush is not being provided;

FIG. 3 is a vertical cross-section AA of an assembled valve of FIG. 1 illustrating the relationship between parts when fast flush is being provided;

Figure 4A:
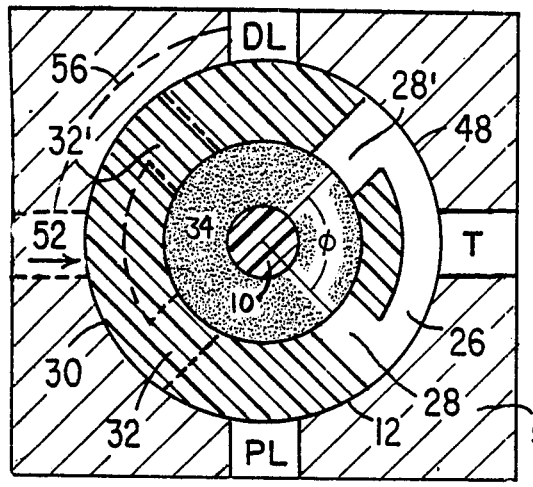
FIG. 4A is a cross-section BB of FIG. 1 when the valve is assembled and not providing a fast flush.

Reference is now made to FIGS. 1-3. The exploded view of FIG. 1 does not show the valve body, but it does illustrate a stem assembly 2, an elastomeric projection assembly 4 that will fit into a cylindrical cavity 6 in the stem assembly 2, and a cap assembly 8 having a plunger 10 that will fit into a space 11 in the elastomeric assembly 4. It is to be understood that each of the assemblies noted above may be integral parts molded from plastic.

The stem assembly 2 is comprised of an annulus 12 having a radial flange 14 extending outwardly from its top. A rim 16 having radial tongues 18 and 18' extending outwardly from opposite sides of its top is mounted on the flange 14. The tongues 18 and 18' subtend a given angle $\theta$, and a handle 20 extends outwardly from the rim 16. Any suitable means 22 can be attached to the bottom of the annulus 12 to retain the stem assembly 2 within the valve body at the proper axial position but, in this case, it is illustrated as having a prism 24 attached thereto for the purpose of identifying the rotational position of the stem assembly 2, as set forth in my U.S. Pat. application, Ser. No. 6/072,515, filed on Sept. 4, 1979, and entitled "Optical Valve Position Sensing".

Only a portion of a circumferential groove 26 in the outer surface of the annulus 12 is seen in FIG. 1. One end of the groove 26 communicates with an opening 28 that extends through the wall of the annulus 12 and, although not seen in this view, it communicates with a similar opening 28', shown in other views, at the other end. As will be seen in FIGS. 4, 5 and 6, the circumferential groove 26 subtends a given angle $\phi$ such as 90°.

A circumferential groove 30 similar to the groove 26 is located on the opposite side of the annulus 12 but is in a radial plane that is below the radial plane of the groove 26. At one end, the circumferential groove 30 communicates with a port 32 that extends to the inside of the annulus 12. The groove 30 subtends an angle $\phi$ and may communicate with a port 32', not shown, at its other end that extends through the wall of the annulus 12.

The elastomeric projection assembly 4 is comprised of a cylindrical bladder 34 in the form of an annulus that is closed at one end and defines the cylindrical space 11 therein. Surrounding the upper end of the bladder 34 is an outwardly extending radial flange 38 of such diameter as to fit within the rim 16. The upper surface of the flange 14 and the lower surface of the flange 38 are shoulders that meet so as to seal off the open end of the annulus 12 and form a confined space, except for the port 32, between the inside of the annulus 12 and the outside of the bladder 34.

A third annulus 39 that is coaxial with the annulus 12 extends upwardly from the top of the flange 38. Its inner diameter is greater than that of the cylindrical space 11, and its outer diameter is less than that of the flange 38.

The cap assembly 8 is comprised of a disc 40 having a rim 42 extending below it. The inner diameter of the rim 42 is enough greater than the outer diameter of the rim 16 of the stem assembly 2 to provide a slide fit therewith. The rim 42 has apertures 44 on opposite sides thereof, only one of which can be seen in FIG. 1, each aperture subtending an angle $\theta$ and having a height that is greater than the height of the tongues 18 and 18'. A slot 46 in the rim 42 is of such size as to fit over the handle 20 and is located to do so when the tongues 18 and 18' of the stem assembly 2 extend through the apertures 44 of the cap assembly 8. The plunger 10 extends downwardly from the center of the disc 40 and is of such diameter as to fit into the space 11 in the projection assembly 4.

COMPLETE ASSEMBLY AND OPERATION

Figure 4B:
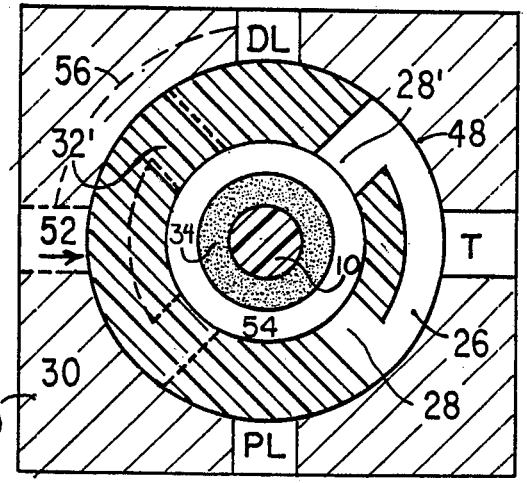
FIG. 4B is a cross-section BB of FIG. 1 when the valve is assembled and providing a fast flush.

FIGS. 2 and 3 are vertical sections taken at AA of FIG. 1 when the valve is completely assembled and the annulus 12 is mounted within a cavity 48 in a valve body 50. As seen in FIGS. 4A and 4B, which are horizontal cross-sections taken at BB of FIG. 1 when the valve is completely assembled and mounted in the cavity 48, the valve body 50 defines a passageway DL that may be connected to a distal lumen, a passageway PL that may be connected to a proximal lumen, and a passageway T that may be connected to a transducer. All these passageways enter the cavity 48 at the same radial plane as the circumferential groove 26 of FIG. 1. One end of the groove 26 communicates with the opening 28, as also seen in FIG. 1, and the other end with an opening 28', not seen in FIG. 1, that extends to the inside of the annulus 12. Also defined within the valve body 50 is a channel 52 that enters the cavity 48 within the same radial plane as the circumferential groove 30 of FIG. 1. One side of the groove 30 communicates with the port 32 shown in FIG. 1 and the other end with a port 32', not shown in FIG. 1, that extend through the wall of the annulus 12. The channel 52, the circumferential groove 30 and the ports 32 and 32' are shown in dotted lines in FIGS. 4A and 4B. In FIG. 2 and FIG. 3, only the channel 52 and the passageway T are in direct view. The entry of the passageway DL is indicated by a dotted circle. Because the passageways, channel and grooves have a finite size, they obviously enter the cavity 48 between two separated radial planes, but a single radial plane is referred to for simplicity of language. When referring to an angle subtended between points at which openings or passageways enter a portion of the structure, the angle between their centers is intended.

In FIGS. 4A and 4B, the stem assembly 2 is oriented within the cavity 48 of the valve body 50 as depicted in the vertical cross-sections of FIGS. 2 and 3 respectively wherein, as indicated by the arrow, the handle 20 lies directly over the point at which the channel 52 enters the cavity 48. In this position, the passageway T is not connected to any other passageway. In FIG. 4A and in FIG. 2, the cap assembly 8 is not depressed so that the bladder 34, which is the elastomeric projection in this specie of the invention, is in its normal condition of axial stress and blocks the openings 28 and 28'. When, however, the cap assembly 8 is depressed, as shown in FIGS. 3 and 4B, the annulus 39 is deformed and the plunger 10 elongates the bladder 34 so as to reduce its cross-section and unblock the openings 28 and 28'. In some designs, the bladder 34 may also block the point where the ports 32 and 32' enter the cavity 6 inside the annulus 12, as shown in FIG. 2, but this is not necessary. In either case, flush fluid supplied to the channel 52 will pass through the groove 30 and the ports 32 and 32' into the enlarged space 54 that is between the inner surface of the annulus 12 and the outer surface of the bladder 34. From there it can reach the passageway T via the openings 28 and 28' and the groove 26, and provide a fast flush to a transducer connected to the passageway T.

It will be apparent that the function of the circumferential groove 30 is to connect the port 32 to the channel 52 regardless of the rotational position of the valve stem assembly 2. It is also apparent that either port 32 or 32' may be eliminated, but this could entrap air bubbles.

Figure 5A:
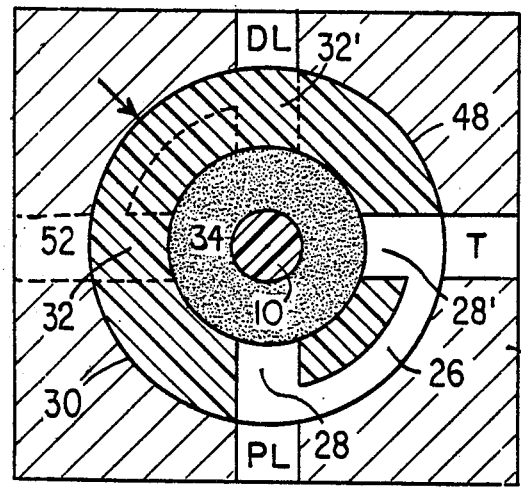
FIGS. 5A and 5B are the same as FIGS. 4A and 4B but illustrate a different rotational position of the valve.
Figure 5B:
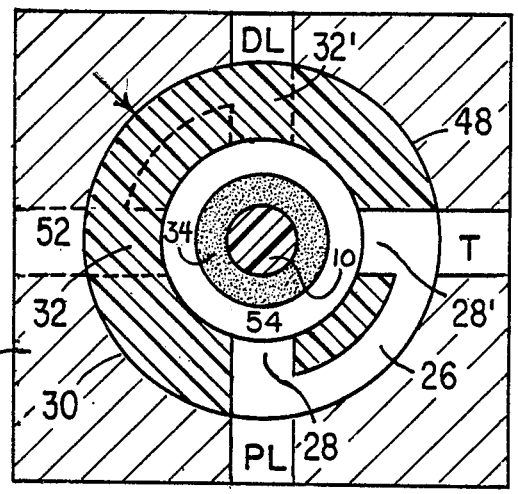

FIG. 5A illustrates the cross-section BB when the rotational position of the handle 20 is such that the proximal lumen channel PL is connected to the transducer channel T via the circumferential groove 26 so that the blood pressure in the proximal lumen may be measured. When the cap assembly 8 is depressed, as illustrated by FIG. 5B, the fast flush fluid will reach the selected passageways PL and T so as to flush both the proximal lumen and the transducer.

Figure 6A:
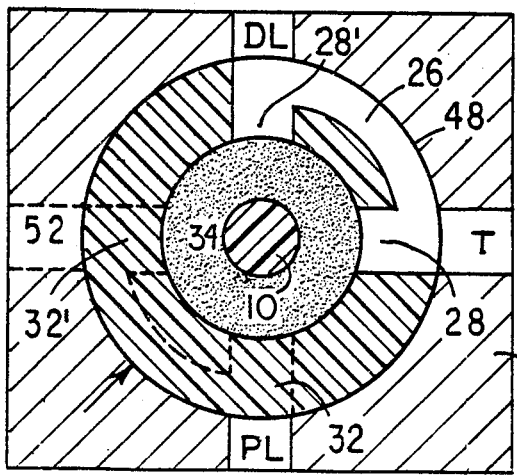
FIGS. 6A and 6B are the same as FIGS. 4A and 4B but illustrate a still different rotational position of the valve.
Figure 6B:
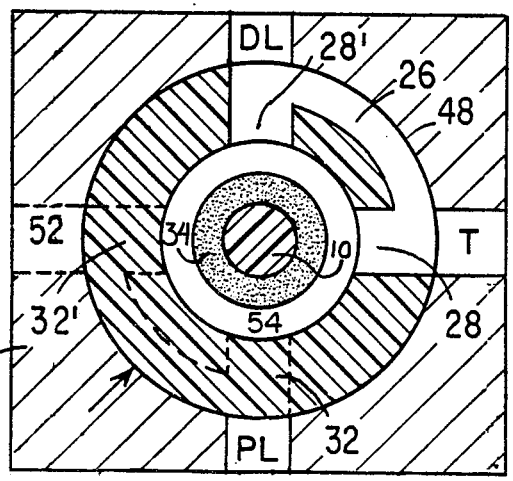

In FIG. 6A, the rotational position of the handle 20 is such as to connect the distal lumen channel DL to the transducer channel T. Both channels will be fast-flushed as indicated in FIG. 6B when the cap assembly 8 is depressed.

It will be apparent that with both ports 32 and 32' present, the circumferential groove 30 can be eliminated and replaced by a circumferential groove in the inner surface of the cavity 48 that subtends an angle of 90° in either direction from the point of entry of the channel 52, e.g., a groove as indicated by the dashed line 56 in FIGS. 4A and 4B. In any rotational position of the handle 20, the flush fluid can reach one of the ports 32 or 32'.

Although the passageways T, DL and PL in the valve body 50 are shown as entering the cavity 48 in a radial plane, they could enter the cavity 48 at points that do not lie in a radial plane as long as they can be made to communicate with openings in the annulus 12 that are joined by a groove in either the inner or outer surfaces of the annulus 12.

Only one of the openings 28 and 28' are required to permit flushing fluid to flow into the groove 26 and into the passageways with which the groove communicates, but having only one opening would permit the entrapment of air.

If it is desired that the fast flush be available only during predetermined rotational positions of the valve assembly, the port means could be comprised of a port or ports extending through the wall of the annulus 12 at such point or points as to provide communication between the channel 52 and the space inside the annulus 12 when the valve assembly is in these positions. This would permit the elimination of the grooves 30 and/or 56.

What is claimed is:

1. A valve, comprising
a valve body,
means defining a cylindrical cavity in said valve body,
means defining a plurality of passageways in said valve body communicating with said cavity at points that are angularly displaced about the axis of the cylindrical cavity,
a hollow stem closed at one end and open at the other,
means mounting said stem for rotation in said cavity,
means adapted to provide communication between respectively different pairs of said points when said stem is in predetermined angular positions, said means including means defining a groove in a surface of said hollow stem and means defining at least one opening extending through the wall of the stem that communicates with said groove,
an elastomeric projection,
means mounting said elastomeric projection within said hollow stem so as to seal the open end of said stem and position said elastomeric projection so that it blocks any openings in the wall of said hollow stem when the elastomeric projection is in a predetermined condition of stress,
means defining a channel in said valve body that communicates with said cavity,
port means extending through the wall of said hollow stem, said port means at the outside of said stem and said channel at the point of entry to said cavity being of such relative configuration as to be in communication with each other when said stem is rotated, and
means for elongating said elastomeric projection so as to reduce its cross-section and enlarge the space between the outside of said elastomeric body and the inside of said hollow stem so as to permit fluid, when introduced in said channel, to flow through said enlarged space to any opening in said hollow stem and into said groove.

2. A valve as set forth in claim 1 wherein
said means defining a plurality of passageways in said valve body defines three passageways in said valve body that respectively enter said cavity at points in a given radial plane, there being a given subtended angle between the point at which one of said passageways enters said cavity and the points where each of the other passageways enter said cavity, and
said means defining at least one opening in the wall of said hollow stem defines two openings lying in a radial plane of said stem that coincides with the radial plane at the points of entry of said passageways, said two openings subtending said given angle between them, and
said means defining a groove in a surface of said hollow stem defines a circumferential groove communicating between said openings.

3. A valve as set forth in claim 2 wherein said channel enters said cavity at a point that is in a radial plane that is displaced toward the closed end of said hollow stem from the radial plane at which said passageways enter said cavity.

4. A flush valve as set forth in claim 3 wherein said means defining port means in the wall of said hollow stem defines two ports subtending said given angle between them, and
means are provided for defining a circumferential groove in a surface of the wall of said hollow stem between said two ports, thereby permitting communication between said channel and the inside of said hollow stem for different rotational positions of said hollow stem.

5. A flush valve as set forth in claim 3 wherein a circumferential groove is defined in the wall of said cavity starting at the point where the said channel enters it and subtending said given angle.

6. A valve as set forth in any of claims 1 through 5 wherein said elastomeric projection is a hollow bladder that is open at one end and closed at the other and wherein said means for elongating said elastomeric projection includes
a plunger, and
means mounting said plunger within said hollow bladder, said mounting means providing a restoring force when said plunger is forced so as to cause the plunger to extend farther into said bladder.

7. A valve as set forth in claim 6 wherein
a first flange surrounds the open end of said hollow stem,
a second flange surrounds the open end of said bladder, said first and second flanges mating to form a seal, and wherein
elastomeric material is located between said second flange and the means mounting said plunger.

8. A valve for connecting selected pairs of adjacent passageways and for conducting fluid thereto when desired, comprising
a valve body,
means defining a cylindrical cavity in said body,
means defining three passageways in said valve body that enter said cavity at points in a radial plane thereof, the subtended angles between one point and the other having a given value,
a first annulus that is closed at one end and open at the other mounted in said cavity with an intersecting fit so as to form a fluid seal between the outside surface of said first annulus and the inside surface of said cavity,
a first flange secured around the open end of said first annulus and in contact with said valve body,
a rim having a larger diameter than said first annulus secured to the side of said flange that is remote from said first annulus, said first annulus and said rim being concentric,
tongues extending outwardly from opposite sides of said rim at the end thereof that is remote from said flange, said tongues subtending said given angle,
means defining openings through said first annulus at points subtending said given angle and in the same radial plane as the points at which said three passageways enter said cavity, means defining a circumferential groove in the outside surface of said first annulus connecting said first and second openings, a bladder of elastomeric material in the form of a second annulus, one end of which is closed and the other open, the said bladder being inserted within said first annulus and having such outer diameter in a given condition of axial stress as to block said openings at the points where they enter the inside of said first annulus, a second flange secured to and extending outwardly from the open end of said bladder, a third annulus of elastomeric material mounted on the opposite side of said flange from said bladder, a cap having a plunger extending from one side thereof, said cap having a rim extending therefrom in the same direction as said plunger, means defining apertures in opposite sides of said rim that subtend said given angle and which have a greater length in the direction of said plunger than the dimension of said tabs along the axis of said first annulus, said cap being mounted with said apertures encompassing said tongues, said plunger extending through the open end of said bladder and to the closed end thereof, said cap resting in the end of said third annulus that is remote from said second flange, means defining a channel in said valve body through which flush fluid may be made to pass, said channel entering said cavity at a point that is on the opposite side of said first flange from said openings, and port means extending through said first annulus in the same radial plane as the point where said channel enters said cavity, the relative configuration of the inside surface of said cavity in a circumferential direction about the point where said channel enters and of the outside surface of said first annulus in a circumferential direction about said port means being such as to maintain communication between said channel and said port as said first annulus is rotated through said given angle.

9. A flush valve, comprising a valve body having means defining a cylindrical cavity therein, a hollow stem mounted in said cavity, said stem being closed at one end and open at the other and having a cylindrical exterior surface, the diameter of which is enough greater than the diameter of said cavity to provide a pressure seal, means defining a plurality of passageways in said valve body respectively communicating with said cavity at poins in a radial plane, there being a given subtended angle between one point and ones in each side thereof, means defining a pair of openings extending through the cylindrical surface of said stem and into its hollow interior, the said openings lying in the said radial plane and the angle subtended between them being said given angle, means defining a circumferential groove in the outer surface of said hollow stem providing communication between said openings, an elastomeric projection mounted inside said hollow stem, said projection blocking said openings, means defining a channel in said valve body, means providing communication between said channel and the interior of said hollow stem when said hollow stem is in different rotational positions, and resilient means for elongating said elastomeric member so as to reduce its cross-section and cause it to unblock said openings.

10. A mechanism for use in a valve assembly, comprising a hollow stem closed at one end and open at the other, means defining a pair of openings extending through the wall of said hollow stem, means defining a groove in a wall of said hollow stem that communicates with said openings, an elastomeric projection mounted within said hollow stem so as to block said openings when it is in a given condition of longitudinal stress, means defining a port extending through the wall of said hollow stem, and means for elongating said elastomeric projection so as to cause it to unblock said openings.

* * * * *